United States Patent

[11] 3,625,772

[72] Inventor Albert Himy
 Tustin, Calif.
[21] Appl. No. 576,009
[22] Filed Aug. 30, 1966
[45] Patented Dec. 7, 1971
[73] Assignee McDonnell Douglas Corporation
 Santa Monica, Calif.

[54] ELECTRODE-SEPARATOR COMBINATION
 12 Claims, 6 Drawing Figs.
[52] U.S. Cl. ................................................. 136/100,
 136/143
[51] Int. Cl. ............................................. H01m 17/00,
 H01m 3/00
[50] Field of Search ...................................... 136/100,
 157, 142–147, 151, 152, 6, 70–72, 86, 63;
 204/263, 282–283, 295; 161/185, 186, 44, 45;
 156/107

[56] References Cited
 UNITED STATES PATENTS
 682,899  9/1901  D'Arnoult ..................... 136/63
 712,178  10/1902 Chamberlain ................. 136/147
 3,118,100 1/1964  Chreitzberg .................. 136/30
 3,446,668 5/1969  Arrance et al. ............... 136/6
 3,126,302 3/1964  Drushella ..................... 136/86
 3,141,795 7/1964  Eisler .......................... 136/6
 3,391,027 7/1968  Porter .......................... 136/86
 FOREIGN PATENTS
 467,696  6/1937  United Kingdom .......... 136/63

Primary Examiner—Winston A. Douglas
Assistant Examiner—Peter D. Rosenberg
Attorney—Max Geldin ABSTRACT: A porous rigid electrode-separator unit of a wafer-type construction. The electrode is sandwiched substantially centrally between two porous rigid inorganic separators of slightly greater size than the electrode so that the separator edges overlap the electrode edges forming a cavity completely around the electrode edges. This cavity is filled with a filler, preferably a resin, e.g., epoxy, which upon cure bonds the separator edges together and completely seals the electrode within.

PATENTED DEC 7 1971 3,625,772
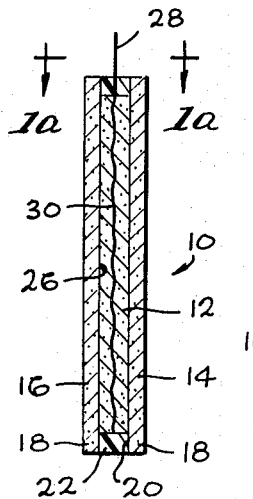
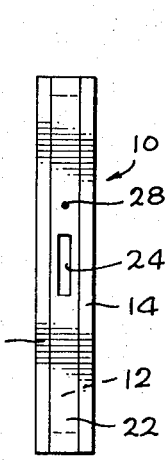
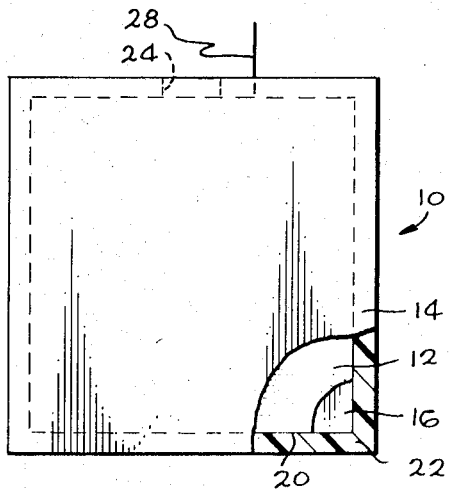
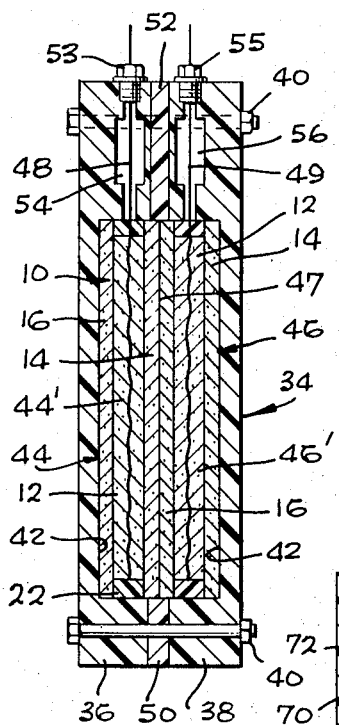
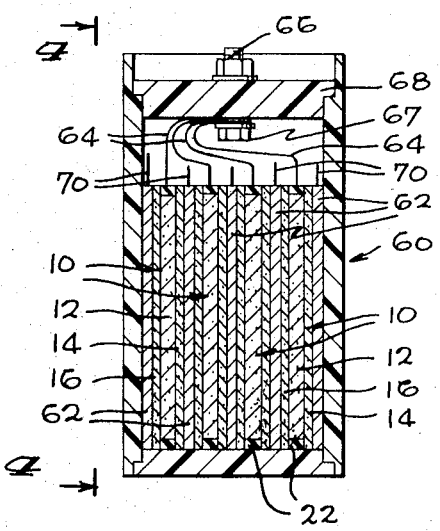
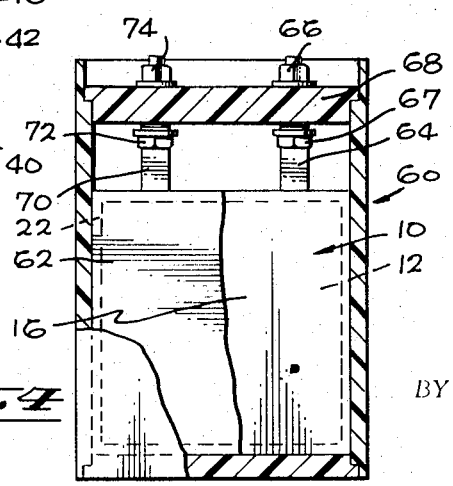
ALBERT HIMY
INVENTOR.
BY Max Gilden
ATTORNEY

ELECTRODE-SEPARATOR COMBINATION

This invention relates to batteries, particularly high energy density batteries, and is especially concerned with an improved electrode-separator combination fabricated in the form of a unit which can be readily assembled into a battery together with other electrode-separator units of the same type, to form an efficient battery.

Batteries are an important source of energy storage for power generation. In addition to the common lead-acid storage battery, an important type of battery particularly suited for airborne applications are the high energy density alkaline electrolyte cells using such electrode combinations as silver-zinc, silver-cadmium and nickel-cadmium. High energy density batteries are generally battery systems which have a substantially higher energy per unit of weight than conventional, e.g., lead-acid storage batteries. Thus, high energy density batteries can develop, e.g., 100 to 140 watt-hours of energy per pound. In addition to important airborne applications, such high energy density batteries have many other applications such as in portable tools and appliances, television, radio and record players, engine starting, portable X-ray units, and the like. In such batteries, it is conventional to employ a separator in the form of a porous member between the electrodes.

In high energy density batteries such as silver-zinc, nickel-cadmium and silver-cadmium, the separator performs the function of retaining electrolyte, e.g., potassium hydroxide, separating the electrodes, and preventing migration of electrode ions or growth of dendritic crystals of electrode ions which short circuit the battery.

Improved inorganic separators particularly suited for use in high energy density batteries are described, for example, in the copending application of Carl Berger and Frank C. Arrance, Ser. No. 499,294, filed Oct. 21, 1965 now U.S. Pat. No. 3,379,570. Such inorganic separators, preferably in the form of sintered ceramic separators, when assembled in a battery of this type, e.g., a silver-zinc high energy density battery, have resulted in substantially improved battery life at both ambient temperature and elevated temperature, that is, a battery capable of operating efficiently over a large number of discharge-charge cycles, and such batteries are also operable at high temperatures, e.g., of the order of 100° C. and above.

When employing the above-noted substantially rigid inorganic separators, it is necessary when assembling such separators in a battery, together with the necessary electrodes or electrode plates, to mount the individual separators in properly spaced relation to provide electrode compartments between adjacent separators, and to then insert the electrodes in the electrode compartments between an adjacent pair of separators. This not only requires proper spacing of the separators so as to receive the electrodes therebetween in relatively snug fitting relation, but also requires that the electrode compartments on opposite sides of a separator be properly insulated to prevent short circuiting of electrolyte from one electrode compartment around a separator and into the adjacent electrode compartment. Such insulation of the adjacent electrodes and electrode compartments when employing the above noted rigid inorganic separator members, is sometimes difficult to accomplish. Further, when employing certain types of electrodes such as zinc electrodes which tend to slump or change shape in a relatively short period of time because of mechanical or electrochemical deterioration, it is often necessary to support such electrodes between adjacent separators forming the electrode compartment, to provide an electrode of suitable strength to withstand satisfactory periods of operation.

Accordingly, it is the object of the present invention to provide an electrode rigid inorganic separator unit which affords ease of assembly of an electrode-separator pack in a battery; to provide electrode-separator units of the above type which when assembled in a battery automatically provides electrodes and electrode compartments which are substantially fully insulated from each other; and to provide an electrode-separator unit in which the electrode is supported by the separator assembly so as to provide a sturdy efficiently operating electrode, suitably mounted in its compartment, formed by adjacent separator members of the unit.

The above and other objects are accomplished according to the invention by forming a "wafer"-type construction in which an electrode, either positive or negative, and of any type, is sandwiched between two porous inorganic, preferably ceramic, separators so that it is centered with the separators overlapping along their edges, forming a cavity around the electrode, and such edge cavity is filled with a chemically resistant filler material such as an epoxy resin, which after curing bonds the two opposite ceramic separators together, encasing the electrode and insulating it.

Thus, according to the invention there is provided an electrode-separator unit which comprises an electrode, e.g., in the form of a plate, a pair of porous rigid inorganic separators disposed on opposite sides of said electrode and in engagement therewith, the edges of said separators overlapping the adjacent edges of said electrode and forming an edge cavity between said overlapping separator edges and around said electrode, and a filler material disposed in said cavity and bonding the opposite separators together.

A plurality of such electrode-separator wafer units can be readily assembled to form an electrode-separator pack in a battery by simply assembling a number of electrode-separator units of one polarity, e.g., containing zinc electrodes, in alternating relation with a number of electrode-separator units of opposite polarity, e.g., containing silver electrodes. When so assembled and preferably with adjacent electrode-separator wafer units in contact, an electrode-separator pack is provided readily in which each of the electrode compartments is fully insulated from the adjacent electrode compartments and wherein each of the electrodes contained in the respective electrode-separator units or wafers, is supported by the opposite separators of the unit, preventing slumping or disintegration of the electrode within its compartment. When assembling the respective electrode-separator units of the invention in a battery to form a battery pack, there is avoided the problem when employing individual separators and electrodes, of requiring first the proper supporting of such individual separators in suitably spaced relation to provide electrode compartments, and the introduction of the individual electrodes in such compartments, and there is also avoided the necessity under these conditions for providing means to properly insulate adjacent electrode compartments from each other.

The invention will be more clearly understood by reference to the description below of certain preferred embodiments of the invention taken in connection with the accompanying drawing wherein:

FIG. 1 is a cross-sectional schematic representation of an electrode-separator unit according to the invention;

FIG. 1a is a plan view taken on line 1a—1a of FIG. 1;

FIG. 1b is a side elevation of the electrode-separator unit of FIG. 1, with parts broken away for clarity;

FIG. 2 shows the manner of assembly of a pair of electrode-separator units according to the invention to form a single-cell battery according to the invention;

FIG. 3 shows the manner of assembly of a plurality of electrode-separator wafer units of the invention, to form a multiplate battery; and FIG. 4 is a section in elevation taken on line 4—4 of FIG. 3, with parts broken away for clarity.

The showings in the drawings are exaggerated for purposes of greater clarity.

In carrying out the invention for obtaining the improved electrode-separator unit or wafer indicated at 10 in FIGS. 1, 1a and 1b, an electrode 12, e.g., in the form of a zinc plate, is centered between a pair of opposite inorganic separators 14 and 16, e.g., porous sintered aluminosilicate separators, the separators 14 and 16 having substantially the same shape as the electrode 12, but being of a somewhat larger size than electrode 12 so that when the electrode is centered and sandwiched between the separators 14 and 16 the overlapping edge portions 18 of the respective separators 14 and 16 form therebetween a cavity 20 completely around the outer edges of the electrode 12. Such edge cavity 20 is filled with a suitable filler material 22 such as an epoxy resin, which upon curing bonds the overlapping edge portions 18 of the opposite inorganic separators 14 and 16 together.

If desired, although not necessary, a narrow slot or aperture 24 can be provided in the filler or resinous material 22 for purposes of more readily introducing electrolyte into the electrode compartment 26 formed between the separators 14 and 16 and occupied by the electrode 12. Such aperture 24 can also serve to vent any gases formed in the electrode compartment 26. A lead or tab 28 is suitably connected to the electrode 12 and is brought through the filler or epoxy resin material 22 filling the edge cavity 20. To provide proper contact between the lead 28 and the electrode 12, a metal current collector grid 30 can be embedded in the electrode 12, the lead wire 28 being connected to one end of such collector grid 30.

The inorganic separator material which can be used to form the porous inorganic separators, e.g., separators 14 and 16 of FIG. 1, can include a variety of inorganic substances. Thus, for example, suitable inorganic separator materials include insoluble hydrous metal oxides such as the hydrous oxides of zirconium, titanium, antimony, tungsten, silicon, scandium, bismuth, vanadium, aluminum and cerium. Such hydrous metal oxide separator materials and their method of preparation are described in the copending application Ser. No. 379,093 filed June 30, 1964 of Carl Berger et al. A preferred separator of this type is hydrous zirconium oxide or zirconia.

Other porous inorganic materials which can be employed for producing the separator according to the invention include the aluminosilicates, particularly the alkali metal and alkaline earth metal aluminosilicates, alumina and silica, particularly because of their formation of a hard ceramic material upon sintering, while still retaining suitable porous characteristics. The aluminosilicates are particularly preferred in this respect. Examples of such aluminosilicates include aluminosilicate, sodium and potassium aluminosilicates, and magnesium, calcium, barium and strontium aluminosilicates. These materials can be used separately, but often mixtures of these aluminosilicates are used, e.g., complex mixtures of both the alkali metal and alkaline earth metal aluminosilicates. Such inorganic separator materials are described in the copending U.S. applications Ser. Nos. 378,858 now abandoned filed June 29, 1964, and 499,294, filed Oct. 21, 1965 of Carl Berger et al. now Pat. No. 3,379,570.

Another useful class of inorganic separator materials are the naturally occuring clay minerals of the kaolinite group. This is a group of naturally occurring clays containing aluminum oxide and silica usually together with bound water, and having the formula $Al_2O_3 \cdot 2SiO_2 \cdot 2H_2O$. In addition to kaolinite, other useful members of this group include the mineral clays halloysite dickite, nacrite and anauxite.

Other types of inorganic separators which can be employed include those in the form of a sintered porous member composed of a solid solution of magnesium silicate and zinc silicate, or a solid solution of magnesium silicate and iron silicate as described and claimed in the copending application Ser. No. 539,554 filed Apr. 1, 1966 of Frank C. Arrance et al. now U.S. Pat. No. 3,446,668, and the inorganic separators in the form of a sintered porous member composed of a solid solution of an aluminum-bearing material such as aluminum oxide, and a substance selected from the group consisting of chromium, cobalt, nickel, magnesium, calcium and iron bearing materials, e.g., a mixture of alumina and chromic oxide, as described and claimed in copending application Ser. No. 555,891 filed June 7, 1966 of Frank C. Arrance et al. now U.S. Pat. No. 3,446,669.

The term "sintered ceramic separators" as employed herein is intended to denote the above-noted sintered inorganic separators.

As the filler material 22 employed for filling the edge cavity 20 between the overlapping outer edges of the opposite separators 14 and 16 and around the outer edges of the electrode 12, there can be employed any suitable material which will securely adhere to the surfaces of the inorganic separators, which has good chemical resistance and is essentially inert to electrolytes such as acids and alkalies, which has good resistance to elevated temperatures in the presence of corrosive chemicals such as acids and alkalies, and which can be readily inserted into the edge cavity 20 in a plastic form, and thereafter hardened or cured to produce a hard tenacious and resistant filler.

In preferred practice, organic resins such as epoxies, polyvinyl resins, and rubber-type materials such as neoprene-type compounds and ethylene-propylene rubbers can be employed. These materials can be heat curable and/or curable by incorporation of suitable well-known catalysts for these materials. Also, if desired, silicate cements in the form of a sodium or potassium silicate containing a ceramic filler such as aluminum oxide can be employed. Particularly suitable fillers have been found to be the epoxies such as those marketed as Epon, e.g., the diglycidyl ether of bisphenol A, and the material marketed as Allbond. Also, the polyvinyl resin marketed as Unichrome 218X can be employed.

Any type of electrodes can be insulated and employed to form a wafer of the type according to the invention. These include the lead electrodes employed in conventional lead-acid batteries, and particularly the zinc, silver, cadmium and nickel electrodes employed in the high energy density batteries. The invention is particularly applicable for supporting and insulating zinc electrodes, which otherwise have the well-known tendency to slump and disintegrate if not properly supported.

The electrode-separator units or wafers described above and illustrated in FIGS. 1, 1a and 1b can be assembled to form a battery as shown in FIG. 2, employing a plastic case 34 formed of two symmetrical, e.g., Teflon, half portions 36 and 38, which are bolted together as indicated at 40. Portions 36 and 38 of the case have recesses 42 formed therein, and providing a single cavity, which receive the zinc-separator unit 44 and the silver-separator unit 46, formed as described above and illustrated in FIGS. 1, 1a and 1b of the drawing. As will be noted in FIG. 2, when assembled in this battery, the two electrode-separator units or wafers 44 and 46 are essentially in contact with each other as indicated at 47. By so placing the electrode-separator wafer units of opposite polarity in contact with each other, efficient electrolyte diffusion takes place from the electrode compartments containing the zinc and silver electrodes 44' and 46', respectively, through the intermediate separator members 14 and 16 of the respective electrode-separator wafers. Note that when positioned in the battery case 34, the wafers 44 and 46 provide proper positioning of the electrodes 44' and 46' automatically, while at the same time providing complete insulation of the electrode compartments 44' and 46' with respect to each other.

It is noted in FIG. 2 that there is a double thickness of separator 14, 16 between the zinc and silver electrodes 44' and 46'. Although this increases resistance and lowers the discharge rate, the battery has longer wet stand life. However, thinner separators can be employed, thus reducing resistance and increasing discharge rate.

Teflon spacers 50 and 52 are provided between the half portions 36 and 38 of the case, to form a leakproof seal. Leads 48 and 49 are in contact with the zinc and silver electrodes 44' and 46', respectively, of the electrode-separator wafers 44 and 46, and such terminal wires are brought through the plastic electrode sections at the top of the assembly and connected to terminals 53 and 55, as shown. Small electrolyte reservoirs 54 and 56 are provided in the upper portion of the respective electrode compartments 36 and 38.

Now referring to FIGS. 3 and 4 of the drawing, for providing a multiplate battery embodying the electrode-separator wafers or units of the invention, numeral 60 represents a battery case in which there is assembled four electrode-separator units 10 according to the invention, and as illustrated in FIG. 1, the electrodes 12 of which are each a zinc electrode and the separators 14 and 16 of which are in the form of sintered porous members composed of a solid solution of magnesium silicate and iron silicate, and employing a cured epoxy resin as the filler material 22 in the edge cavity 20. In alternating manner between the electrode-separator wafer units 10 are positioned five conventional silver electrodes 62. Each of the electrode-separator wafers 10 is in contact with the adjacent silver electrodes 62.

It will be seen that the respective electrode-separator wafers 10 and the alternate silver electrodes 62 are readily positioned with respect to each other in the battery case 60 and when so assembled as shown in FIG. 3, no special construction is required for placing the separators 14 and 16 in proper position to form the respective electrode compartments to receive the zinc and silver electrodes. Thus, the separators 14 and 16 and the respective electrode compartments containing the silver and zinc electrodes are automatically provided, with the zinc electrode compartments completely insulated from the silver electrode compartments by the separators and the edge cavity insulation formed by epoxy resin 22 of each of the zinc electrode-separator units 10.

As will be apparent from the embodiment of FIGS. 3 and 4, in a multiplate battery only one set of electrodes of one polarity, such as the zinc electrodes, need by encapsulated or enclosed in the form of a wafer according to the invention, the other electrodes of opposite polarity such as the silver electrodes being conventional electrodes. However, if desired, and as illustrated in FIG. 2 of the drawing, both the zinc and silver electrodes can be encapsulated respectively in the form of wafers, sandwiched between a pair of separators and insulated in the edge cavity, according to the invention.

It will be understood that the type of case 60 shown in FIGS. 3 and 4, and employed for housing the multiple electrode-separator units 10 and the multiple silver electrodes 62, can also be employed in place of the case 34 shown in FIG. 2, for housing the single zinc and silver electrode-separator units 44 and 46.

The thickness of the inorganic separators or membranes such as 14 and 16 can vary, and can range, for example, from about 0.010 to about 0.030 inch, although this range is only understood to be exemplary. The thickness of the zinc and silver electrodes also can of course vary and can range, for example, from about 0.010 to about 0.150 inch.

Conductive electrode tabs or ribbons 64 which are connected to the zinc electrodes 12 are attached to terminal 66 by means of locknuts 67, mounted on the battery cover 68. Likewise, conductive tabs 70 which are connected to the upper ends of the silver electrodes 62 are connected by means of locknuts 72 to a second terminal 74 also mounted on the battery cover.

In a test employing the silver-zinc multiplate battery described above and illustrated in FIGS. 3 and 4, according to the invention, and using 30 percent KOH as electrolyte, the battery was operated for 36 cycles, being fully discharged in each cycle before being recharged, such test being carried out at room temperature. In each discharge cycle, capacity of the battery at the commencement of the cycle was 6.2 AH (ampere hours) and only dropped to about 6 AH at the end of the cycle. Voltage was maintained at a voltage plateau of about 1.4 volts during the discharge cycle, dropping to about 1 volt at discharge. Current density was about 10 ma./cm.$^2$.

From this data, it is apparent that the battery construction of the invention employing the electrode-separator units hereof permits the obtaining of high capacity throughout each discharge cycle and the active electrode material, particularly the zinc electrode contained in such units is maintained and supported without disintegration and prolonging battery life.

In a test of the same battery illustrated in FIGS. 3 and 4 at 100° C., and employing one-half hour discharge and 1-hour charge cycles, and operating to 20 percent depth of discharge during each discharge cycle, a voltage plateau of 1.4 volts was obtained at a current density of 14 ma./cm.$^2$.

Although in FIG. 1a above, the electrode-separator unit or wafer 10 is shown as including an aperture 24 for introduction of electrolyte, if desired, no such aperture need be provided, particularly where the battery is to be operated at room temperature and under certain conditions of operation. Thus, the electrode, e.g., 12, can be completely enclosed by the filler material, e.g., epoxy, at 22, with sufficient porosity provided by the porous inorganic separators 14 and 16 to absorb and furnish electrolyte to the electrode compartments.

Further, although when assembled in a battery, the adjacent electrode-separator units of FIG. 2 or the adjacent electrode-separator units and conventional electrodes as illustrated in FIGS. 3 and 4, are shown as being in direct contact with each other, if desired, these respective adjacent units can be somewhat spaced apart, or for example a material such as felt can be placed between the electrode-separator units 44 and 46, at 47, in FIG. 2, or between the electrode-separator units 10 and the adjacent conventional silver electrodes 62 in the embodiment of FIG. 3. However, for best operating efficiency, the electrode-separator units, or electrode-separator units and electrodes are preferably placed in contact with each other, as illustrated in FIGS. 2 and 3.

From the foregoing, it is seen that the invention provides a novel electrode-separator unit which has several advantages in permitting ease of assembly of such units in a battery, providing insulation between the respective electrode compartments, and in supporting the electrodes embodied in these units. The battery containing such electrode-inorganic separator units or wafers operates efficiently over a number of charge-discharge cycles at both ambient and elevated temperatures.

During discharge of batteries such as those described and illustrated above, as is well known, e.g., in the case of a silver-zinc battery, the zinc converts to zinc oxide and the silver oxide to silver and during charging of such batteries the silver is oxidized to silver oxide and the zinc oxide is reduced to zinc. Because of these reversible reactions, the terms "silver" and "zinc," the terms "silver" and "cadmium," the terms "nickel" and "cadmium," and the term "lead" referring to the metals forming the respective electrodes of silver-zinc, silver-cadmium, nickel-cadmium and lead-acid battery systems, are intended to denote either the respective metals themselves or the corresponding oxides thereof.

While I have described particular embodiments of my invention for purposes of illustration within the spirit of the invention, it will be understood that the invention is not to be taken as limited, except by the scope of the appended claims.

I claim:

1. An electrode-separator unit which comprises an electrode of from about 0.010 to about 0.150 inch in thickness selected from the group consisting of zinc, silver, cadmium and nickel, a pair of porous rigid inorganic separators disposed on opposite sides of said electrode and in engagement therewith to prevent slumping or disintegration of the electrode, each of said separators being sintered, and of from about 0.010 to about 0.030 inch in thickness and composed of a material selected from the group consisting of insoluble hydrous metal oxides, aluminosilicates, alumina, a solid solution of magnesium silicate and a member selected from the group consisting of zinc silicate, iron silicate, and a solid solution of aluminum oxide and a substance selected from the group consisting of chromium, cobalt, nickel, magnesium, calcium and iron oxides, wherein the edges of said separators overlap the adjacent edges of said electrodes and form an edge cavity between said overlapping separator edges and around said electrode, and a filler material disposed in said cavity and bonding the opposite separators together.

2. An electrode separator unit as defined in claim 1, said filler material being an organic resin selected from the group consisting of epoxies, polyvinyl resins, neoprene, and ethylene-propylene rubbers wherein said organic resin is resistant to alkali and to elevated temperatures.

3. A battery comprising a case, at least one electrode-separator unit as defined in claim 1, positioned in said case, a second electrode member positioned in said case, said electrode-separator unit and said electrode member being in side-by-side relation, said electrode member having a polarity opposite to the electrode of said electrode-separator unit, and electrical connections to said electrode member and to said electrode of said electrode-separator unit.

4. An electrode-separator unit as defined in claim 1, said electrode being a zinc electrode.

5. A battery as defined in claim 3, wherein said electrode member is also in the form of a second electrode-separator unit as defined in claim 23, the electrode of said second electrode-separator unit having a polarity opposite to the electrode of said first-mentioned electrode-separator unit.

6. A battery as defined in claim 3, wherein the electrode of said electrode-separator unit is a zinc electrode.

7. A battery as defined in claim 3, wherein said second electrode member is an electrode plate.

8. A battery as defined in claim 3, wherein said electrode member is also in the form of a second electrode-separator unit as defined in claim 1, the electrode of said second electrode-separator unit having a polarity opposite to the electrode of said first-mentioned electrode-separator unit, and said electrode member being a silver electrode.

9. A battery as defined in claim 3, including a plurality of said electrode-separator units and a plurality of said second electrode members arranged in side-by-side relation, with said electrode-separator units in alternating arrangement with said electrode members, said electrical connections to the electrodes of all said electrode-separator units being connected to a common terminal, and said electrical connections to all of said electrode members being connected to a second common terminal.

10. A battery as defined in claim 9, wherein the electrodes of each of said electrode-separator units are zinc electrodes, and said electrode members are each silver electrodes.

11. A battery as defined in claim 9, wherein the electrodes of each of said electrode-separator units are zinc electrodes, and said electrode members are each silver electrodes, and the filler material of said zinc electrode-separator units is an epoxy resin.

12. An electrode-separator unit which comprises an electrode of from about 0.010 to about 0.150 inch in thickness and of a material selected from the group consisting of zinc, silver, cadmium and nickel, a pair of porous rigid inorganic separators each of from about 0.010 to about 0.030 inch in thickness and disposed on opposite sides of said electrode and in engagement therewith to prevent slumping or disintegration of the electrode, said separators being sintered separators composed of a material selected from the group consisting of insoluble hydrous metal oxides, aluminosilicates, alumina, a solid solution of magnesium silicate and a material selected from the group consisting of zinc silicate and iron silicate, and a solid solution of aluminum oxide and a substance selected from the group consisting of chromium, cobalt, nickel, magnesium, calcium and iron bearing materials the edges of said separators extending outwardly beyond and overlapping the adjacent edges of said electrode and forming an edge cavity between said overlapping separator edges and around said electrode, and a filler material disposed in said cavity and bonding the opposite separators together, including an aperture in said filler material in communication with an edge of said electrode.

* * * * *